United States Patent [19]

Dorner

[11] Patent Number: 4,732,256
[45] Date of Patent: Mar. 22, 1988

[54] STORAGE UNIT FOR A CONVEYOR SYSTEM

[75] Inventor: Wolfgang C. Dorner, Oconomowoc, Wis.

[73] Assignee: Dorner Mfg. Corp., Hartland, Wis.

[21] Appl. No.: 830,442

[22] Filed: Feb. 18, 1986

[51] Int. Cl.⁴ .......................................... B65G 37/00
[52] U.S. Cl. ..................................... 198/347; 198/433
[58] Field of Search ............... 198/347, 448, 451, 433, 198/420, 430

[56] References Cited

U.S. PATENT DOCUMENTS

| | | |
|---|---|---|
| 2,576,369 | 11/1951 | Sticelber ............................ 198/451 |
| 2,596,404 | 5/1952 | Holbeck ............................ 198/430 |
| 2,953,234 | 9/1960 | Abendschein . |
| 3,360,100 | 12/1967 | Seragnoli . |
| 3,470,996 | 10/1969 | Lee et al. . |
| 3,499,555 | 3/1970 | Wahle . |
| 3,557,932 | 1/1971 | Lamb ............................ 198/433 X |
| 3,876,057 | 4/1975 | Jones . |
| 3,923,148 | 2/1975 | Dorner ............................. 198/570 |
| 3,931,882 | 1/1976 | Ossbahr . |
| 3,954,165 | 5/1976 | Snyder . |
| 4,141,458 | 2/1979 | Brooks et al. . |
| 4,219,112 | 8/1980 | Loewenthal ....................... 198/433 |
| 4,240,538 | 12/1980 | Hawkes et al. ................. 198/451 X |
| 4,273,234 | 6/1981 | Bourgeois . |
| 4,290,517 | 9/1981 | Hafferkamp . |
| 4,354,591 | 10/1982 | Sexstone et al. ............... 198/451 X |
| 4,383,600 | 5/1972 | Southerling et al. ............... 198/347 |
| 4,487,309 | 12/1984 | Dorner . |
| 4,609,091 | 9/1986 | Dorner ............................ 198/347 |

FOREIGN PATENT DOCUMENTS

| | | |
|---|---|---|
| 960177 | 12/1974 | Canada . |
| 2633384 | 1/1978 | Fed. Rep. of Germany ...... 198/433 |
| 1518326 | 3/1968 | France . |
| 477144 | 12/1937 | United Kingdom . |

Primary Examiner—Robert J. Spar
Assistant Examiner—Cheryl L. Gastineau
Attorney, Agent, or Firm—Andrus, Sceales, Starke & Sawall

[57] ABSTRACT

An improved storage unit for a conveyor system. Articles are conveyed on a main conveyor and a plurality of secondary conveyors extend laterally from a side edge of the main conveyor. When a slow-down occurs downstream in the conveyor system, successive rows of articles are stopped on the main conveyor and are transferred onto the secondary conveyors. When the secondary conveyors are filled with rows of articles, the rows are elevated to a storage location. Subsequently, when the slow-down ceases, the rows of articles are lowered onto the secondary conveyors, and are returned to the main conveyor. As each row is moved onto the main conveyor, an elongated positioning member is pivoted downwardly from an elevated storage location into engagement with a trailing surface on each of the articles in the row to urge the articles back onto the main conveyor. Under normal operation of the conveying system when the storage unit is not utilized, the positioning member is located along a side edge of the main conveyor and serves as a guide for conveying of articles on the main conveyor.

8 Claims, 7 Drawing Figures

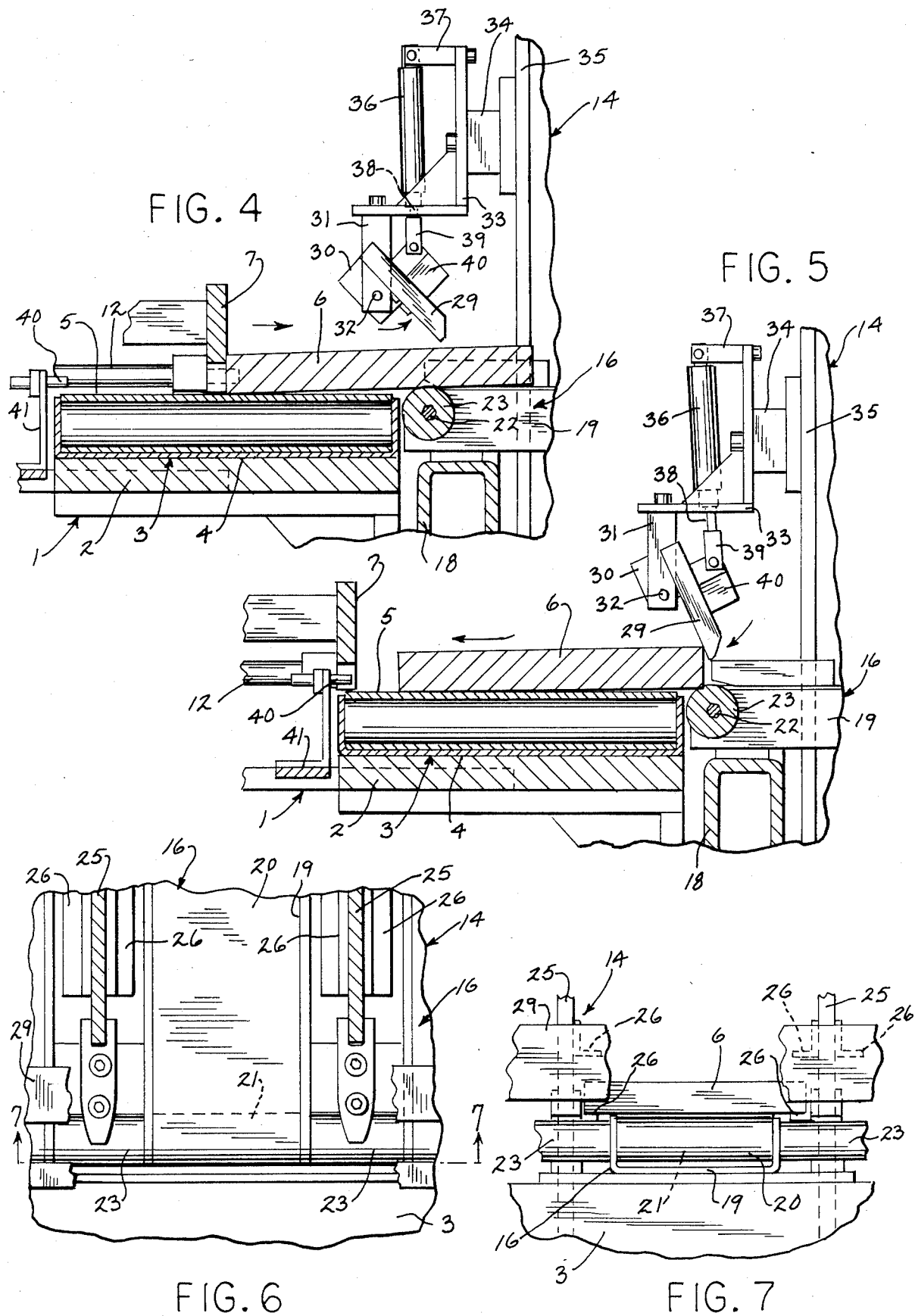

STORAGE UNIT FOR A CONVEYOR SYSTEM

BACKGROUND OF THE INVENTION

In a conveying system, storage units are often utilized to balance the flow of articles in the conveying system. For example, if a stoppage or slow-down occurs downstream in the conveying system, the articles can be stored or accumulated in a storage unit and when the slowdown has ceased, the stored articles are automatically fed back into the conveyor system.

U.S. patent application Ser. No. 06/669,625, filed Nov. 8, 1984, now U.S. Pat. No. 4,609,091 discloses a storage unit for a conveying system which comprises a series of parallel secondary conveyors that extend laterally from a side edge of a main conveyor. When it is desired to store articles, a stop is moved to an obstructing position above the main conveyor to stop a row or train or articles. The row of articles is then transferred laterally from the main conveyor to the secondary conveyors and the row is conveyed on the secondary conveyors to a stopped position. Successive rows are similarly transferred from the main conveyor to the secondary conveyors.

As disclosed in the aforementioned patent application, when the secondary conveyors are filled with a plurality of rows of articles, lift members are elevated between the spaced secondary conveyors to lift the articles to a storage location.

Subsequently, when it is desired to return the articles to the conveying system, the rows of articles are lowered onto the secondary conveyors and are conveyed back to the main conveyor. As the first row is returned to the main conveyor, the secondary conveyors are momentarily reversed in direction of movement to separate the first row from the remaining rows.

As disclosed in the above-mentioned patent application, to insure complete return of the articles in a row to the main conveyor, positioning members are located between adjacent secondary conveyor and as the remaining rows are separated from the first row, the positioning members are elevated, causing inclined surfaces on the positioning members to engage the trailing edge of each article in the row and urge the articles onto the main conveyor.

SUMMARY OF THE INVENTION

The invention is directed to an improved storage unit for a conveyor system and more particlarly to an improved mechanism for guiding and returning rows of articles onto the main conveyor from the secondary conveyors.

In accordance with the invention, a plurality of parallel secondary conveyors extend laterally from a side edge of the main conveyor, and an elongated guide and positioning member is mounted along the side edge above the level of the main and secondary conveyors. During normal operation of the conveying system, the guide and positioning member will serve to guide the flow of articles along the main conveyor.

When it is desired to store articles, a row or train of articles is stopped on the main conveyor and the guide and positioning member is then pivoted upwardly to an elevated position above the level of the articles. The row of articles is then transferred from the main conveyor to the secondary conveyors.

When it is desired to return the rows of articles to the main conveyor, the secondary conveyors are reversed in direction to move the articles in a direction toward the main conveyor. As the first row of articles is moved onto the main conveyor, the secondary conveyors are momentarily reversed in direction of movement to separate the first row from the remaining rows, and then the guide and positioning member is moved downwardly from the storage position toward the guiding position. As the member moves toward the guiding position, it engages a trailing surface on each of the articles in the row to urge the articles back onto the main conveyor.

By positively urging the row of articles back onto the main conveyor, the row will be properly aligned on the main conveyor, so that corners of the articles in the row will not catch or hang up on the secondary conveyors, or on downstream guide rails, as the row is being conveyed away on the main conveyor.

The guide and positioning member performs a dual function, in that it serves as a guide rail during normal operation of the conveyor system and also functions as a pusher to engage and return the row of articles to the main conveyor when the storage operation has been concluded.

Due to the manner in which the guide and positioning member is mounted, it will positively engage the trailing end on each article in the row to push the article onto the main conveyor to insure that even lightweight articles are properly returned to the main conveyor.

If the articles being conveyed are provided with an upwardly extending projection, the guide and positioning member can be moved into engagement with the projection without the necessity of separating the rows as they are being returned to the main conveyor.

Other objects and advantages will appear in the course of the following description.

DESCRIPTION OF THE DRAWINGS

The drawings illustrate the best mode presently contemplated of carrying out the invention.

In the drawings:

FIG. 4 is a view similar to FIG. 3 showing an article being transferred to the secondary conveyors and the guide and positioning member in the inoperative or storage position;

FIG. 5 is a view similar to FIG. 3 and showing the guide and positioning member moving an article back onto the main conveyor;

FIG. 6 is an enlarged fragmentary top plan view of a secondary conveyor and the guide and positioning member; and FIG. 7 is a view taken along line 7—7 of FIG. 6.

DESCRIPTION OF THE ILLUSTRATED EMBODIMENT

Figure 1:
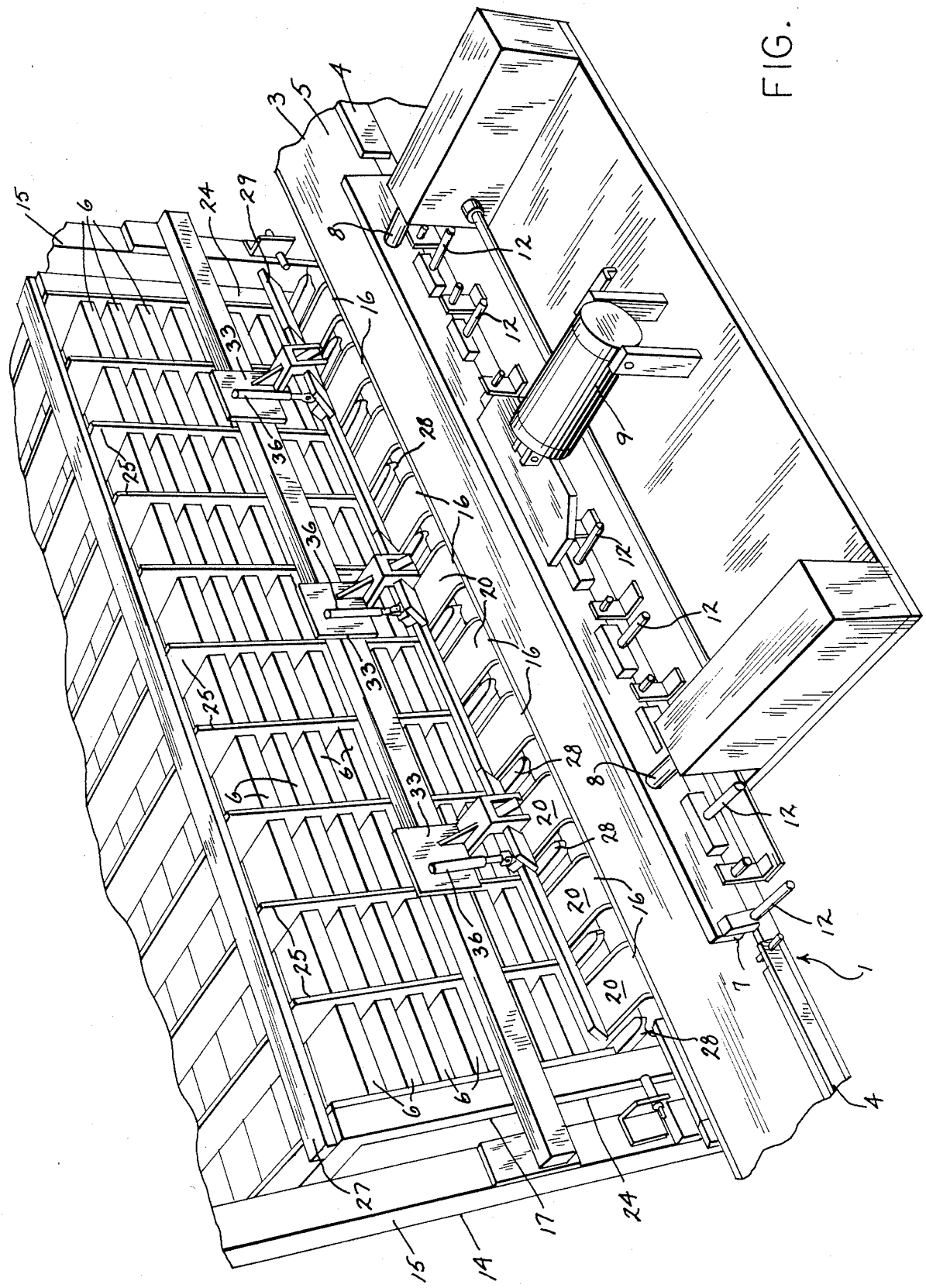
FIG. 1 is a perspective view of the storage unit of the invention.

The drawings illustrate a conveyor system, including a supporting structure or main frame 1 having a support plate 2 which supports a main conveyor 3. Conveyor 3 includes a generally U-shaped frame 4 on which an endless belt 5 is mounted for travel. A plurality of articles 6 are conveyed in end-to-end relation on the conveyor 3.

As illustrated in the drawings, the articles are generally rectangular in shape, although it is contemplated that the articles can take various configurations. In some installations, the articles 6 may be work holders or pallets that support workpieces on which various working operations are to be performed, as the pallets move through the conveying system.

Mounted along a side edge of main conveyor 3 is a generally vertical pusher plate 7 which is supported by a pair of guide rods 8. As disclosed in the copending U.S. patent application Ser. No. 06/669,625, filed Nov. 8, 1984 the pusher plate 7 is actuated in reciprocating movement by a hydraulic cylinder 9, to move the plate in a reciprocating path to push a row of articles 6 on main conveyor 3 laterally from the conveyor.

Located at spaced locations along the length of pusher plate 7 are a plurality of stop assemblies 12, each having a stop pin 13 that can be moved between a non-obstructing position and an obstructing position where the stop pin will be engaged by an article 6 moving along the conveyor 3 to stop movement of the article on the moving conveyor. The stop assemblies 12 may be constructed in the manner shown in U.S. Pat. No. 4,487,309.

Located on the opposite side of main conveyor 3 from pusher plate 7 is a storage unit 14. In general, storage unit 14 includes a fixed frame 15 having a generally U-shaped horizontal cross section and a plurality of spaced parallel secondary conveyors 16 are mounted on frame 15 and extend laterally from the side edge of main conveyor 3, as best shown in FIG. 1. In addition, storage unit 14 includes a lift unit 17, also U-shaped in horizontal section, that acts to lift multiple rows of articles on the secondary conveyors 16 upwardly to a storage location.

Figure 3:
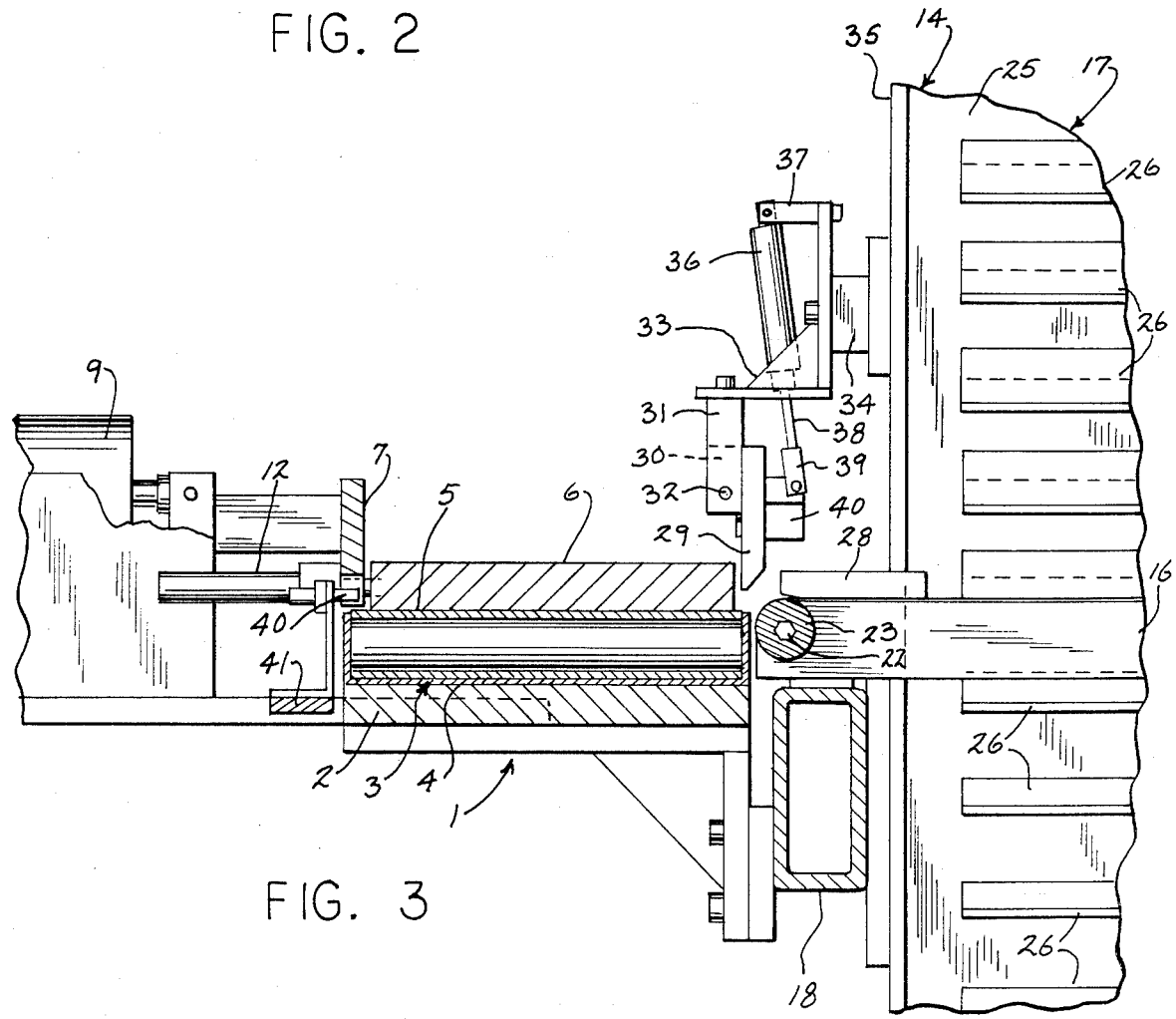
FIG. 3 is a side elevation showing the guide and positioning member in the guiding position.

As shown in FIG. 3, the ends of secondary conveyors 16 are supported on a generally rectangular beam 18 that is secured to frame 15. Each secondary conveyor includes a U-shaped frame 19 and an endless belt 20 is trained over a drive pulley 21 which is journalled in the end of frame 19 adjacent main conveyor 3.

Shaft 22 interconnects the drive pulleys 21 and is driven by a suitable reversible motor, not shown. By operating the motor in one direction, the upper run of the belts 20 will travel in a direction away from the main conveyor, while operation of the motor in the opposite direction will move the upper run in a direction toward the main conveyor.

Mounted on shaft 22 between adjacent secondary conveyors 16 is a sleeve or roller 23. The outer diameter of sleeve 23 is approximately equal to the outer diameter of the drive pulleys 21 and the sleeves rotate with shaft 22.

In certain installations, the articles 6 may have hollow undersurfaces, and the overhanging side ends of the articles will engage the sleeves 23 to prevent the articles from tilting as they are moved between main conveyor 3 and secondary conveyors 16.

Lift unit 17 includes a pair of side members 24 and a series of generally vertical plates 25 which are mounted in spaced relation between the side members 24. Each plate 25 is provided with a plurality of supporting ledges or shoulders 26, and as best illustrated in FIG. 7, the article 6, when stored, are supported on the ledges 26 of adjacent plates 25. The lift unit 17 can be constructed and operated in the manner as shown in the aforementioned U.S. patent application.

A top brace 27 extends across the top of the side members 24 and is connected to the upper edge of each of the lift plates 25.

To guide the plates 25 in vertical movement, guide blocks 28 are mounted on frame 15 between adjacent secondary conveyors 16, and each guide block 28 is formed with a vertical groove which receives the forward edge of the respective plates 25.

Figure 2:
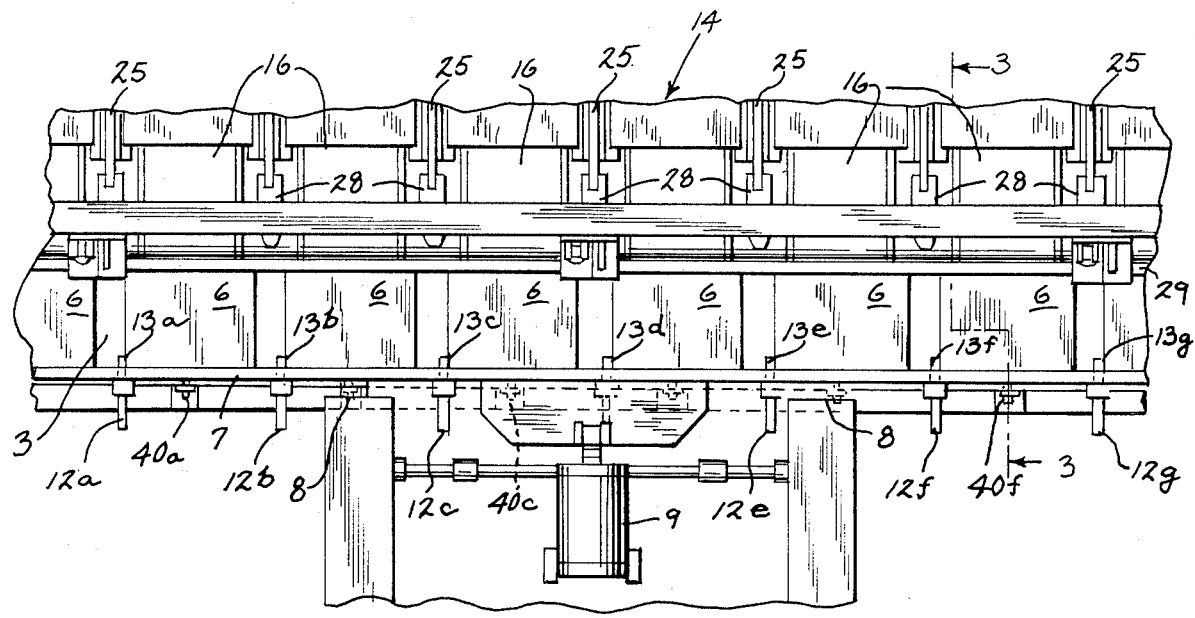
FIG. 2 is a top plan view of a portion of the storage unit.

In accordance with the invention, a guide and positioning bar 29 is mounted above and along one side of main conveyor 3. During normal use of the conveying system, bar 29 acts to guide articles 6 in travel along main conveyor 3, as illustrated FIG. 2.

The upper edge of bar 29 is provided with a group of spaced pivot blocks 30 which are connected to yokes 31 by pivot pins 32. Each yoke 31 is carried by the horizontal leg of an L-shaped bracket 33, and the vertical leg of each bracket is connected through a spacer 34 to the vertical column 35 of frame 15.

Bar 29 is adapted to be pivoted from a generally vertical guiding position, as shown in FIG. 3, to an inclined position, as shown in FIG. 4 by a group of fluid cylinders 36. The upper end of each cylinder 36 is pivotally connected to a yoke 37 on bracket 33, while piston rod 38, which is slidable in cylinder 36, carries a clevis 39 that is pivotally connected to a block 40 mounted on the rear surface of bar 29.

Cylinders 36 act in unison and by introducing fluid into the lower end of each cylinder 36, the piston rods 38 will be retracted to pivot bar 29 from the vertical guiding position to the inclined inoperative or storage position.

OPERATION

Articles 6 are conveyed on main conveyor 3 and if a slowdown or stoppage should occur downstream that requires the articles to be stored, the downstream stop 12a (See FIG. 2) will be actuated moving the stop pin 13a to the obstructing position to stop the next article being conveyed on the main conveyor. A sensor 40a is located immediately behind the stop 12a and is carried by a bracket 41. Sensor 40a will sense the presence of the article 6 stopped by the stop 12a and will actuate the next succeeding stop 12b to move stop pin 13b to the outer position and stop a second article on the main conveyor. In a similar manner, the stopped second article will actuate the sensor 40b which, in turn, will operate the next succeeding stop 12c to stop a third article on the main conveyor.

With the system illustrated in the drawings, the row or train of articles are stopped in an end-to-end spaced relation. In other installations, the articles 6 may be stopped in a contacting end-to-end relation.

When a full row of articles has been stopped on the main conveyor, air cylinder 36 is actuated to pivot bar 29 to the upper inoperative position, and pusher plate 7 is then actuated through operation of cylinder 9 to push the row of articles onto the secondary conveyors 16 where the row is transferred in a direction away from the main conveyor. Stops, not shown, are located at the far ends of the secondary conveyors and serve to limit the travel of the row of articles on the secondary conveyors.

Succeeding rows of articles are stopped on the main conveyor 3, in the manner described, and each succeeding row is then pushed onto the secondary conveyors 16 and conveyed along the secondary conveyors into contact with the preceding row.

When the secondary conveyors are filled with rows of articles, the lift plates 25 are elevated causing the ledges 26 to move upwardly and engage the overhanging edges of the articles 6, thereby lifting the rows of articles from the secondary conveyors 16 to a storage position.

This procedure is repeated with successive tiers of articles being elevated from the secondary conveyors.

When it is desired to return the articles back to the main conveyor, the lift unit 17 is operated to lower the lift plates 25, causing the lowermost tier of articles to be returned to the secondary conveyors. The secondary conveyors are then operated in a reverse direction, toward main conveyor 3, causing a row of the articles to be returned to the main conveyor. As the first row is returned to main conveyor 3, the secondary conveyors 16 are momentarily reversed in direction of operation causing the remaining rows to move in a direction away from the main conveyor to separate the remaining rows from the first row of articles.

Bar 29 is then operated through action of cylinders 36 to move the bar downwardly toward the vertical position and the bar will engage the trailing ends of the articles in the row to urge the row back onto the main conveyor. This action insures that all of the articles in the row will be completely transferred onto the conveyor 3, so that as the articles are conveyed away on conveyor 3, the downstream corners of the articles will not catch or hang up on the secondary conveyors, or on the downstream guide rails.

Bar 29 serves a dual function, in that during normal operation of the conveyor system it serves as a guide rail to guide movement of the articles along the main conveyor. During return of the articles from the storage unit to the main conveyor, the bar operates to engage the trailing ends of the articles to insure the proper and full return of the articles to the main conveyor.

While the drawings have illustrated the articles being in the form of generally rectangular objects, it is contemplated that in certain installations the articles 6 may have other configurations, such as circular, oval, or triangular. In addition, the articles 6 may have hollow undersurfaces or may have upwardly extending projections. If the articles are formed with upwardly extending projections, the bar 29 can be positioned to engage the projections to urge the articles back onto the main conveyor, in which case it would not be necessary to separate the first row of articles from the remaining rows in order to move the bar 29 into contact with the articles. However, it is still important to momentarily reverse the direction of the secondary conveyors in order to insure a gap between successive rows.

Various modes of carrying out the invention are contemplated as being within the scope of the following claims particulary pointing out and distinctly claiming the subject matter which is regarded as the invention.

I claim:

1. In a conveyor system, a supporting structure, a main conveyor mounted on the supporting structure, means for stopping a row of articles on the main conveyor, a plurality of parallel second conveyors extending laterally from a first side edge of the main conveyor, transfer means for transferring a row of articles from the main conveyor to the secondary conveyors, reversible drive means operably connected to the secondary conveyors for operating said secondary conveyors in a first direction away from said main conveyor to convey said row of articles in said first direction and for operating said secondary conveyors in a second direction towards said main conveyor to return said row of articles to the main conveyor, an elongated member disposed adjacent said first side edge of the main conveyor and movable between a first guiding position where said elongated member serves to guide said articles moving along said main conveyor and a second elevated position above said secondary conveyors where said elongated member will not interfere with transfer of said row of articles between said main conveyor and said secondary conveyors, and actuating means for moving the elongated member between said first and second positions, said elongated member being constructed and arranged so that movement of said elongated member from the second elevated position toward said first guiding position will engage a trailing surface of the articles in said row and urge said articles back onto the main conveyor.

2. The conveyor system of claim 1, and including mounting means for pivotally mounting said elongated member for movement between said first guiding position and said second elevated position.

3. The conveying system of claim 2, wherein said elongated member is disposed vertically when in said first guiding position and is disposed at an angle to the vertical when in said second elevated position.

4. The conveying system of claim 1, wherein said elongated member comprises a bar extending across each of said secondary conveyors.

5. In a conveying system, a supporting structure, a main conveyor to convey a plurality of articles, means for stopping a row of articles on the main conveyor, a plurality of parallel secondary conveyors extending laterally from a first side edge of the main conveyor, pusher means mounted along a second side edge of said main conveyor and movable laterally across said main conveyor to transfer a row of articles stopped on the main conveyor onto the respective secondary conveyors, reversible drive means operably connected to the secondary conveyors to operate said secondary conveyors in a first direction away from said main conveyor to convey the row away from the main conveyor and operable in a second direction toward said main conveyor to return said row to said main conveyor, a guide bar extending laterally of said secondary conveyors, said guide bar being movable between a first guide position where said guide bar is parallel to said pusher plate and is disposed to guide said articles moving on said main conveyor to a second elevated position at a level above said conveyors where said guide bar will not interfere with transfer of said articles between the main conveyor and the secondary conveyors, means for pivotally mounting said guide bar for movement between said first and second positions, and actuating means for moving said guide bar between said positions, said guide bar being constructed and arranged so that movement of said guide bar from said second position toward said first position will cause the lower end of said guide bar to engage a trailing surface on each of said articles in a row being transferred back to said main conveyor to urge said articles back onto said main conveyor.

6. In a conveying system, a supporting structure, a main conveyor mounted on the supporting structure for conveying a plurality of articles, means for stopping a row of articles on the main conveyor, a plurality of parallel secondary conveyors extending laterally from a first side edge of the main conveyor, transfer means for transferring a row of articles from the main conveyor to the secondary conveyors, opposite ends of said articles overhanging the side edges of the respective secondary conveyors, each secondary conveyor comprising a frame, a drive pulley mounted for rotation on said frame and an endless conveying member mounted on said drive pulley, a drive shaft interconnecting said pulleys, and a plurality of sleeves mounted on said shaft with each sleeve being disposed between adjacent secondary conveyors, the outer diameter of said sleeve being substantially equal to the outer diameter of said drive pulleys, said sleeves being rotatable with said drive shaft and preventing the overhanging ends of said articles from tilting as said articles are transferred between said main conveyor and said secondary conveyors.

7. A method of conveying, comprising the steps of conveying a plurality of articles on a main conveyor, positioning a movable and elongated guide member in a guiding position along a first side edge of the main conveyor to guide said articles in movement, stopping a plurality of articles on the main conveyor in the form of a row, moving said guide member upwardly to an elevated position above the level of said articles on said main conveyor, transferring said row of articles onto a plurality of parallel secondary conveyors disposed laterally to said side edge of the main conveyor, returning said row from said secondary conveyors to said main conveyor, and moving said guide member downwardly from the elevated position toward the guiding position and engaging said guide member with a trailing surface on each of said articles in said row to urge said articles back onto said main conveyor.

8. The method of claim 7, wherein said step of moving said guide member upwardly comprises pivoting said guide member in a direction upwardly and away from said main conveyor.

* * * * *